3,101,627
TRANSMISSION SYSTEMS AND CONTROLS THEREFOR
Douglas F. Linsley, Westport, Conn., and Harry J. Miller, Jr., Jericho, N.Y., assignors to Morgan Development Laboratories, Inc., Westport, Conn., a corporation of Delaware
Filed Aug. 17, 1959, Ser. No. 834,269
26 Claims. (Cl. 74—645)

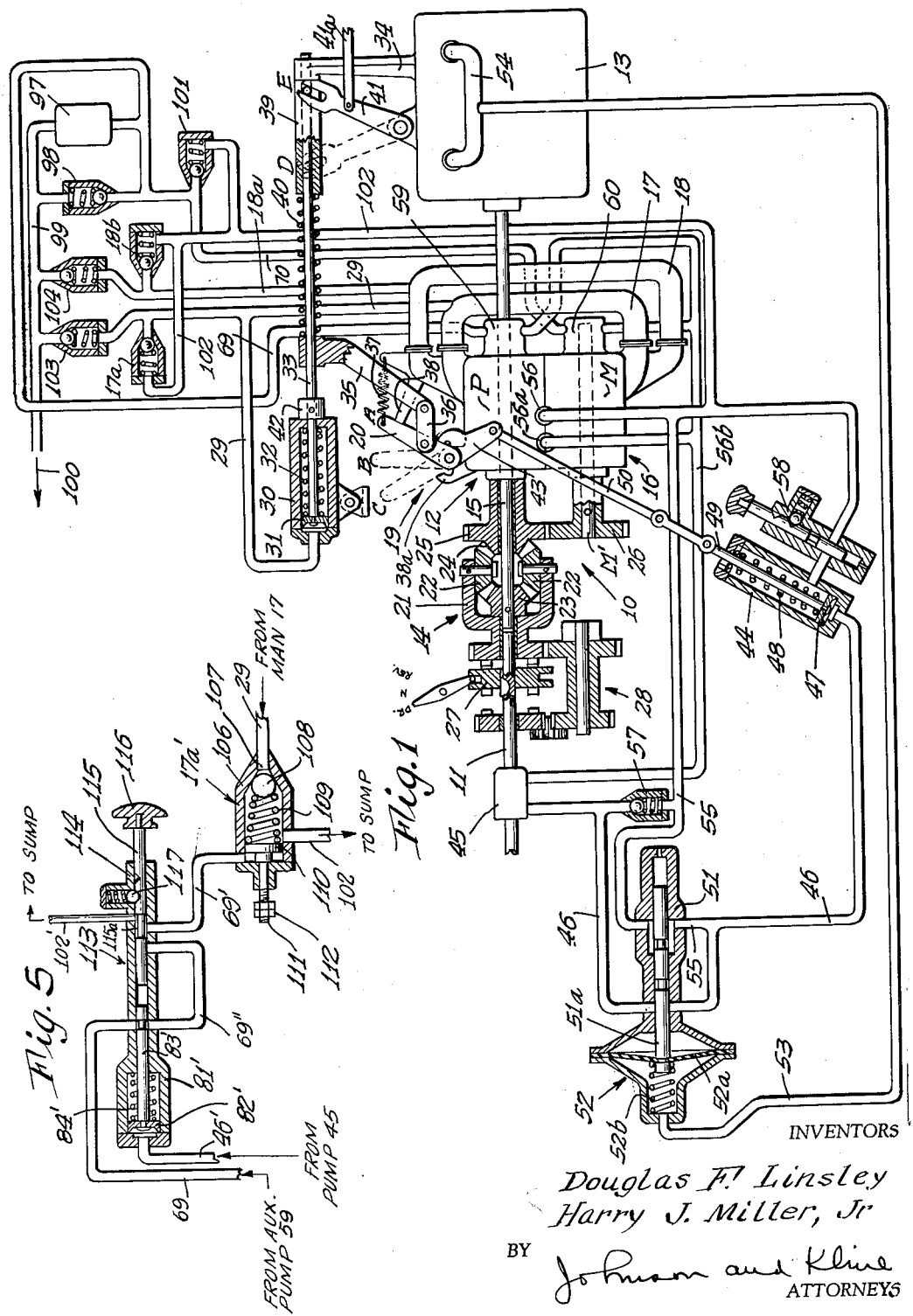

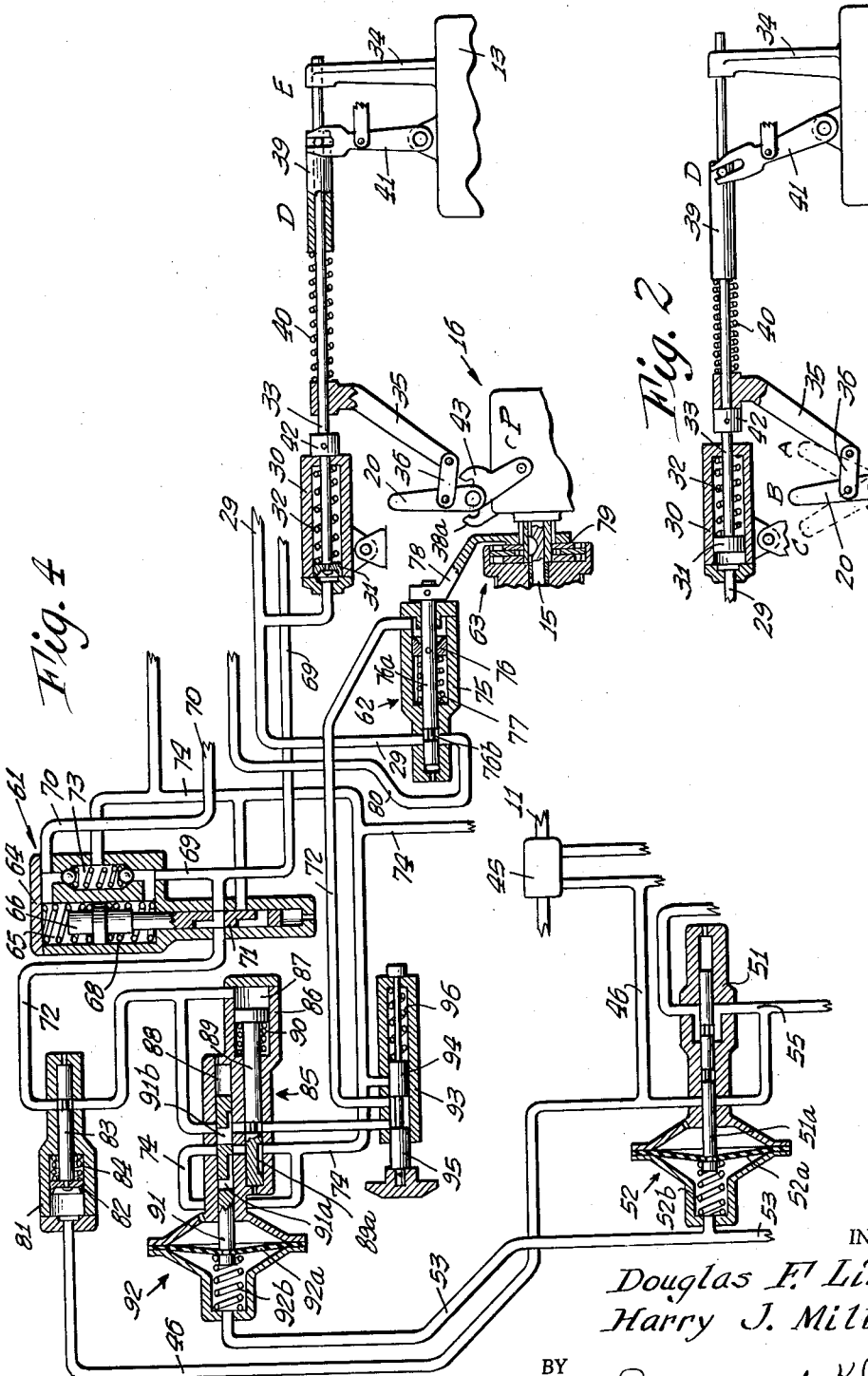

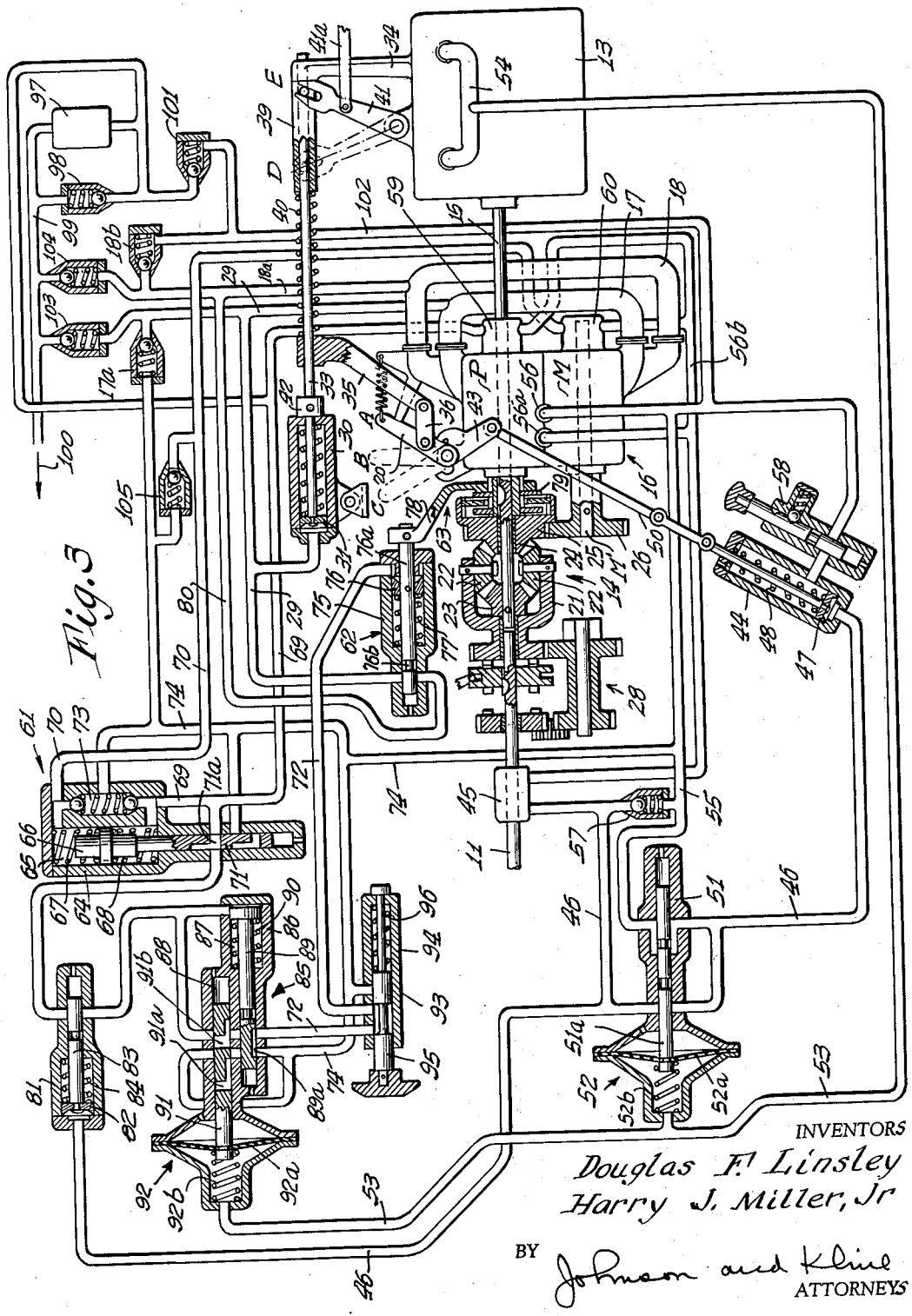

This invention relates to a transmission for transmitting power from a drive shaft to a driven shaft and constitutes an improvement on our copending application Serial No. 781,305, filed December 18, 1958. More specifically, it pertains to a transmission of general automotive utility in which the ratio of speed or torque increase and reduction between the driven shaft and the drive shaft is automatically universally variable over the entire range for which the device is constructed without the necessity of breaking the positive chain of connections from the prime mover to the mechanism to be driven.

In our prior application, a variable speed transmission is disclosed which combines the function of a variable speed unit and a fixed ratio drive in a manner whereby the transmission of power in one direction is the function of the conjoint action of the fixed ratio drive and the variable speed unit, while the control of the transmission of power in the said one direction is the independent function of the variable speed unit.

In the variable speed transmission disclosed in our prior application the drive shaft is operated by a differential mechanism having one side thereof driven by the prime mover and the other side by a hydraulic drive unit whose speed is variable between predetermined limits. According to that invention the variable speed unit, which was of the type disclosed in Patent No. 3,038,311, and included a hydraulic pump driven by the prime mover and a hydraulic motor driven by the pump, was variable through a first range of speed change from a predetermined value in one direction to nil and a second range of speed change from nil to a predetermined value in the opposite direction. It was disclosed in our prior application Serial No. 781,305 that the transmission of increasing power or motion to the driven member from full stop position to full drive position is effected without varying the speed of the fixed ratio drive, i.e. the prime mover, but that the variation in speed, over a wide range imparted to the driven member, is solely the function of the variable speed unit.

It will be understood that, as a result of the differential connection between the driven member and the prime mover and variable speed unit, the torque transmitted by the transmission is equally divided between the bevel gear of the variable speed unit and the bevel gear of the prime mover and further the operation of the hydraulic pump through direct coupling to the prime mover establishes a fixed operational ratio between the variable speed unit and the prime mover. As disclosed in our prior application, variations in the speed of the variable speed unit through the first and second ranges of speed change function to vary the speed imparted to the driven member from full stop to full power and also vary the operational ratio between the variable speed unit and the prime mover so that a desirable torque multiplication is achieved.

According to the present invention means are provided for automatically varying the operational ratio between the output of the variable speed unit and the prime mover as the latter is accelerated and decelerated and for controlling the variation of the ratio therebetween to achieve required torque multiplication.

It is an object of the invention to link the means for accelerating and decelerating the prime mover to the controls for varying the speed of the variable speed unit so that changes in the speed of the former will be proportionally imparted to the latter to progressively vary the operational ratio therebetween.

It is also an object of the invention to provide means, responsive to torque increase in the transmission, for controlling the variation of the speed of the variable speed unit in opposition to the speed change of the prime mover whereby a controlled variation in operational ratio between the former and the latter is achieved to accommodate varying torque requirements.

According to this invention, control over the variation of speed of the variable speed unit, as torque is increased, is accomplished by retarding the controls for varying the output speed of the variable speed unit in opposition to the movement imparted thereto by the accelerator for the prime mover. The means for regulating variations in the speed of the variable speed unit, for progressively controllably changing the operational ratio between the unit and the prime mover, is responsive to the increase and decrease in the pressure of fluid flowing between the hydraulic pump and the hydraulic motor of the variable speed unit and is operated thereby. In starting, for instance, as torque increases, with a resultant increase in pressure between the pump and motor, a "low" operational ratio is maintained between the prime mover and the output of the variable speed unit and as the torque in the transmission diminishes, with the pressure between the pump and the motor decreasing, the speed of the variable speed unit is varied to a "high" or optimum operational running ratio therebetween.

Another object of the invention is to provide means for varying the output speed of the variable speed unit, relative to the prime mover, which means is responsive to an increase in the speed of the output shaft of the transmission under overriding or decelerating conditions relative to the speed of the prime mover. According to this invention, the controls for the variable speed unit are linked to the output shaft of the transmission so that the speed of the unit is automatically controlled as the speed of the prime mover varies relative to the speed of the output shaft. The link between the output shaft and the transmission of the variable speed unit is completed as the result of deceleration of the prime mover relative to the output shaft or a reverse application of torque through the transmission.

An important feature of the invention resides in the variation of the ratio of operation between the prime mover and the variable speed unit, when the speed of the output shaft is greater than that of the prime mover, since engine braking is facilitated by progressive controlled torque multiplication and strain in the transmission is held to a minimum.

Another feature of the invention is the provision of means for delaying the operation of the automatic controls as in engine braking until the output shaft of the transmission has obtained some predetermined speed.

Another important improvement disclosed in the instant invention over the invention of our prior application is means for automatically coupling the output shaft to the prime mover for direct drive thereby when a constant speed-torque relation, i.e. road load torque, or substantially constant torque demand, is achieved in the transmission, thus substantially eliminating the work load on the variable speed unit.

According to the invention, a coupling means for causing the output shaft to be driven directly by the prime mover is automatically operated by a pressure responsive device which in turn is actuated by means for sensing a speed differential between the hydraulic pump and the hydraulic motor of the variable speed unit. Means are provided for automatically delaying the operation of the pressure responsive device until a predetermined speed-torque relationship is established in the transmission and for discontinuing the operation of the pressure responsive device, when the predetermined speed-torque relation is altered.

It is, therefore, another object of the invention to provide a variable speed transmission having automatic means for coupling the prime mover and output shaft in direct drive relation.

It is further an object of the invention to provide means for controlling the direct drive means so that it is operated only at such time as the transmission obtains a constant speed-torque relationship.

A still further object of the invention is to provide means for automatically disconnecting the output shaft from direct drive relation with the prime mover which is actuated in response to an increase in torque in the transmission as the result of acceleration of the prime mover and/or increased load.

Another feature of the invention is the provision of means for automatically delaying the operation of the automatic coupling means until a predetermined speed is achieved in the output shaft and thereafter discontinuing such operation when the speed drops below the predetermined value.

Other objects and advantages will be apparent from the specification and claims when considered in connection with the attached sheets of drawings illustrated in one form of the invention wherein like characters represent like parts and in which:

FIGURE 1 is a diagrammatic illustration of a variable speed transmission system embodying the automatic controls of the invention for regulating the output speed of the variable speed unit relative to the prime mover;

FIG. 2 is a fragmentary view of the operating linkage between the prime mover accelerator and the control for the variable speed unit and shows the control being retarded against adjustment thereof by the prime mover accelerator;

FIG. 3 is a diagrammatic illustration similar to FIG. 1, but additionally showing means for automatically coupling the output shaft to the prime mover for direct drive thereby;

FIG. 4 is a fragmentary diagrammatic illustration of the apparatus of FIG. 3 in direct drive or coupled position; and FIG. 5 is a fragmentary diagrammatic illustration of a control modification.

The present invention, while it may be adapted for many uses wherein it is necessary to transmit power from a driving member to a driven member, is shown in the illustrated form of the invention, for purpose of explanation, in its preferred form as embodied in an automotive vehicle.

Referring now to the drawings for a more detailed description of the invention, in FIG. 1 a variable speed transmission 10 is shown connected to a driven member or output shaft 11 for driving the same. The transmission, which is adapted to transmit variable power or motion to the driven member, includes a driving means 12, which is adapted to be driven by an acceleratable and deceleratable prime mover 13, and means in the form of a differential mechanism 14 for operably connecting the driving means to the output shaft 11. Driving means 12 comprises two separate cooperating drive elements, one of which is an input shaft 15 adapted to be connected to and driven directly by the prime mover and the other is a variable speed drive unit 16 which is adapted to be driven by the input shaft 15. While it is contemplated that any conventional reversible, infinitely variable speed drive unit which may serve the purpose may be used, we prefer utilizing a hydraulic variable speed unit of the type disclosed in Patent No. 3,038,311. A variable speed device of this type may have two structurally alike units, one serving as a pump P while the other unit serves as a motor M, each unit having cylinders and pistons. The pump and motor units are interconnected through manifolds 17 and 18 which facilitate fluid flow from the pump to the motor and from the motor back to the pump, respectively. According to the invention the pump P is driven directly by the input shaft from the prime mover with a resultant flow of fluid from the pump through manifold 17 operating motor M. The volumetric output of the pump, which may be varied, is adapted to drive the motor at universally variable speeds from a predetermined value in one direction to nil and from nil to a predetermined value in an opposite direction. In order to vary the volumetric output of pump P and thereby vary the speed and direction of output of motor M of the variable speed unit, a control device 19 including a lever 20 is included in the system of the variable speed unit. The control lever 20, which may be manually or automatically operated, is infinitely movable between predetermined limits. The major positions of the lever, shown in full and dotted lines, are identified by the letters A, B and C which respectively indicate maximum speed of the motor M in one direction, nil and maximum speed of the motor M in the opposite direction.

At this point it should be understood that there is an established operating ratio between the prime mover 13 and variable speed unit 16 which is the result of the pump P of the variable speed unit being driven by the input shaft 15 from the prime mover; variations in the speed of the prime mover effect the speed of the variable speed unit in direct proportion to their effect on input shaft 15. The operational ratio between the prime mover and the output of the variable speed unit is varied by changing the rate of fluid flow from pump P to motor M, to vary the output speed of the unit. This is achieved by adjustment of the control means, i.e. by the manipulation of control lever 20.

The transmission of power or motion from the prime mover through input shaft 15 and variable speed unit 16, which comprises driving means 12, is, as aforenoted, through a differential mechanism 14 which, in the form shown, comprises a yoke 21 operably connected to the output shaft 11, idler gears 22 carrying the yoke, a bevel gear 23 on the input shaft 15 which meshes with idler gears 22 on one side, and a bevel gear 24 on the other side of the idler gears. The bevel gear 24 is connected to a gear 25 and both freely rotate on input shaft 15. The gear 25 meshes with a gear 26 secured to shaft M' of the motor M of variable speed unit 16 and has a 1 to 1 ratio with gear 25 as shown.

Rotation or speed of output shaft 11, as more fully described in our copending application Serial No. 781,-305, is the resultant of the speeds and relative direction of rotation of the bevel gears 23 and 24. It will be understood that, when input shaft 15 rotates clockwise at a determinate speed carrying bevel gear 23 with it, when bevel gear 24 is rotated by motor M counterclockwise at a determinate speed of like value, as would be the case with control lever 20 of the variable speed unit in A position, idler gears 22 will remain stationary and no motion will be transmitted through yoke 21 to output shaft 11. Assuming that control lever 20 is thereafter moved to position B, varying the speed of variable speed unit 16 through the first range of speed change to nil, bevel gear 24 becomes stationary since no motion is being transmitted to it from motor M of the variable speed unit. With bevel gear 24 in stationary position, yoke 21 will be carried by idler gears 22 through an orbit around bevel gear 23 at one half the speed of rotation of the bevel gear 23 and the output shaft will, therefore, likewise have a speed equal to one half the input speed from the prime mover. Assuming again that control lever 20 of the variable speed unit is now shifted to C position, varying the speed of the variable speed unit through the second range of speed change from nil to the predetermined value in the opposite direction, it will be seen that bevel gear 24 is now being rotated in the same direction as bevel gear 23 at the same speed and the idler gears 22, which are locked between the bevel gears, will rotate in an orbit therewith at the same speed at which the bevel gears are being rotated. Thus, output shaft 11 is driven at full speed, i.e. at a speed which is identical with the input speed from the prime mover or in a 1 to 1 ratio therewith.

In the embodiment of our invention in an automotive vehicle, the yoke 21 of differential mechanism 14 is connected directly to output shaft 11 in the forward drive position through a slide clutch 27 carried by the output shaft and in the reverse position through a reverse gear train assembly 28 and the clutch. An intermediate or neutral position of slide clutch 27 on the output shaft operably disconnects yoke 21 therefrom.

*Control System for Automatic Operation of Variable Speed Transmission*

As was previously discussed, the variable speed unit 16 is provided with control means 19 for varying the flow of fluid from hydraulic pump P to hydraulic motor M, whereby the speed of the variable speed unit is infinitely varied through a first range of speed change from a predetermined value in one direction to nil and thereafter through a second range of speed change from nil to a predetermined value in the opposite direction. The variation in speed of the variable speed unit, imparted by control 19, results in a variation in the operational driving ratio between the unit and the prime mover thereby adapting the transmission to increases or decreases in torque. When the prime mover is operating and the variable speed control lever 20 is in A position, the input shaft 15 and the output of the variable speed unit are rotating in opposite directions at equal speeds and no motion is imparted to the output shaft 11 of the transmission and there is infinite torque potential. It will be understood that the infinite torque potential which the transmission is capable of delivering to the output shaft 11 will place an excessively heavy strain on the transmission structure, such that the parts thereof would have to be unduly large. In order to overcome this problem, the manifolds 17 and 18, between the hydraulic pump P and motor M, have been vented to a sump 56 in the transmission through lines 29, 18a, and 102 to bleed the manifolds and contain the torque output of the transmission within predetermined limits. It should be noted that the pressure in the manifolds is directly proportional to the torque on the output shaft 11 of the transmission. Safety check valves 17a and 18b are positioned in the lines 29 and 18a, respectively, to open when manifold pressure or torque potential is excessive and to close when pressure and torque potential decrease to a predetermined value. For the purpose of the present explanation, it will be assumed that, with the prime mover 13 operating at a speed sufficient to start the vehicle, the check valves 17a and 18b will open as lever 20 is moved out of A position toward B position to dissipate torque, and will close as the lever 20 is moved toward B position and torque diminishes, at some predetermined position of lever 20 between positions A and B. It will be assumed that, when the predetermined torque potential and manifold pressure are reached and valves 17a and 18b close so that the manifolds 17 and 18 are no longer vented to the sump 56, a 4 to 1 operational ratio will exist between the prime mover and the output of the variable speed unit 16 and lever 20 will be in a position adjacent A. Thereafter, as the prime mover is accelerated, the operational ratio between the prime mover and the output of the variable speed unit varies from 4 to 1 to some ratio, such as 2 to 1, as the lever 20 is advanced from its position adjacent A to B position. Further, it will be assumed that, with the vehicle being driven at a steady road speed with no increase in torque, a 1 to 1 operational ratio exists between the prime mover and the output of the variable speed unit when lever 20 is in C position.

When it is desired to start output shaft 11 turning or to start the vehicle moving from stop position, as is the case in the present embodiment of the invention, it is necessary to accelerate the prime mover from idling speed or increase its speed. The 4 to 1 operational ratio, in the example mentioned, existing between the prime mover and the variable speed unit when the lever 20 is in a position adjacent A, facilitates overcoming the inertia of the vehicle and enables the transmission to produce the necessary torque to overcome the increased load of starting. After the vehicle is started moving and as the torque load on the transmission begins to decrease under normal road conditions, the operational ratio between the variable speed unit and the prime mover may be varied progressively from the low ratio of say 4 to 1 to a high ratio of 1 to 1. This is accomplished by moving lever 20 from its position adjacent A through the first range of speed change to B position and through the second range of speed change to C position.

The present invention provides means for automatically varying the speed of the variable speed unit as the prime mover is accelerated and decelerated and further provides means for controlling variations in the speed of the variable speed unit so that a sufficiently low operational ratio is maintained between the variable speed unit and the prime mover to meet the torque requirements in the transmission.

According to the invention, the basis for the automatic control of the transmission system is the pressure in the manifold 17 leading from the pump P to the hydraulic motor M. This pressure is, as aforenoted, directly proportional to the torque on the output shaft which in turn is the resultant of the combination of road conditions, vehicle load and throttle settings, the latter being determined by the driver. The manifold 17, which as previously noted, provides the passage through which fluid flows from the pump to the motor, is connected through the line 29 to a servomotor or control cylinder 30, for a purpose to be hereinafter explained. The servomotor includes a piston 31, which is urged by a spring 32 toward the end of the cylinder which opens into line 29 and is provided with an elongate piston rod 33 extending outwardly of the cylinder and slidably mounted at its outer end in a bracket 34 on or adjacent the prime mover 13. An arm 35 is slidably carried by piston rod 33 outwardly of cylinder 30 and is connected through link means 36 to lever 20 of variable speed unit control means 19. It should here be noted that lever 20 of control means 19 is normally biased by a spring 37 into A position and that stop means 38 and 38a are provided for preventing the lever 20 from being shifted past A or C positions respectively. The piston rod 33 slidably carries at its end directed away from servomotor 30 and outwardly of arm 35, an elongate sleeve 39 which is spaced from the arm by a coil spring 40. The sleeve is operably connected to the throttle or accelerator control 41 of the prime mover, and is adapted to be shifted thereby between positions D and E during the acceleration and deceleration of the prime mover respectively. The accelerator, according to conventional practice is operated by suitable means such as a link 41a. A collar 42 is fixedly carried by piston rod 33 between servomotor 30 and arm 35 and is adapted to be moved by the piston rod toward the arm for a purpose to be hereinafter explained.

It will be seen from the above description and with reference to FIGS. 1 and 2, that movement of throttle 41 of the prime mover affects the control lever 20 of the variable speed unit through the sleeve 39, spring 40, arm 35 and link 36 to move the control lever between A and C positions, thereby varying the operational ratio of the transmission. The variation in the speed of the variable speed unit which is normally imparted thereto upon a shifting of the throttle between E and D positions, is opposed, when torque requirements dictate the necessity for a low operational ratio to be maintained between the prime mover and the output of the variable speed unit, by the servomotor 30 being actuated to shift collar 42 into engagement with arm 35 to retard movement of the same. The servomotor 30 is actuated by an increase in pressure in manifold 17 resulting, as was previously stated, from an increase in torque in the transmission. The increased pressure in the manifold forces piston 31 to the right in cylinder 30 thereby shifting the piston rod and collar against arm 35.

In the operation of the instant invention, as embodied in an automotive vehicle, with the engine or prime mover idling and the slide clutch 27 in forward drive position, and levers 20 and 41 in A and E positions respectively, there will be no rotation of output shaft 11 or movement of the vehicle since the left hand and right hand bevel gears of the differential mechanism 14 will be turning at equal speeds in opposite directions.

When it is desired to start the vehicle moving or to impart motion to output shaft 11, the throttle or accelerator control lever 41 is moved toward position D causing variable speed unit control lever 20 to be moved progressively toward positions B and C by the spring linkage between the throttle and the lever 20. It will be understood that the pressure imparted to move lever 20 by the throttle is greater than the restraining pressure of biasing spring 37 which is attached to lever 20. As variable speed unit control lever 20 is progressively moved from A position through the first range of speed change toward B position, the hydraulic motor M slows up progressively to nil speed and as the lever is continued to be moved past position B through the second range of speed change toward position C the hydraulic motor increases in speed toward a maximum speed in the opposite direction, thereby causing bevel gear 24 to turn in the same direction as bevel gear 23 and approaching the speed thereof.

When a condition calling for maximum torque for rapid acceleration or the like is encountered, fluid pressure in manifold 17 builds up due to immediate mechanical torque build-up in the differential, and servomotor 30 is actuated, thereby causing the piston rod 33 and collar 42 to move against arm 35 and spring 40, returning and/or retarding the same. By controlling the position and movement of arm 35 against the pressure of spring 40 and throttle 41, the progressive movement of lever 20 is controlled and the variable speed unit 16 is prevented from being moved progressively through the first and second ranges of speed change. In this manner, prime mover 13 is allowed to accelerate and develop high horsepower input to the transmission while the low operational ratio is maintained with a variable speed unit and high torque and low speed conditions are imparted to the output shaft. Since the pressure in manifold 17 is a function of torque and the restraining force of the servomotor 30 is proportional to the pressure in the manifold, as the torque and pressure lower, the lever 20 is permitted to progressively move toward positions B and C causing an increase in speed on output shaft 11 in conformance with power input from the prime mover. The transition between the reduction of torque and increase of vehicle speed is smooth and without interruption of the torque applied to the output shaft 11 due to the infinitely variable nature of the variable speed unit and the automatic control over variations in its speed in response to torque requirements and acceleration and deceleration of the prime mover.

After the vehicle is moving at a constant speed with little or no increase in torque, i.e. on a level road with little or no acceleration or deceleration, the throttle lever 41 is positioned somewhere between positions E and D and the variable speed unit control lever 20 is at or near position C. Under these "road load" conditions torque requirements are low and sufficient only to overcome the wind and road resistances, etc., and, therefore, the pressure in manifold 17 is proportionally low so that servomotor 30 is barely functioning, if at all, to restrain control lever 20 from moving into maximum speed or C position.

It should be noted that the mechanical connections between throttle 41 and variable speed unit control lever 20 are such that in some predetermined position between engine idling position E and full throttle position D sufficient movement is imparted to control lever 20 to move it through its full range of speed change from A to C position.

In the operation of variable speed transmissions, particularly when they are embodied in automotive vehicles or the like, there are occasions when it is desirable to positively control the lowering of the operational ratio of the transmission so that undue strain is not imposed upon the transmission or the engine and engine braking is facilitated. It is necessary to control the lowering of the operational ratio of the transmission when the prime mover is rapidly decelerated and power input is greater than power output or put it another way, when the vehicle overrides the engine and the power input is transferred to the output shaft from the input shaft. It will be seen that when this condition occurs there will be what may be called a reversed torque in the transmission, which if the operational ratio of the transmission is not controlled will place excessive strain on the transmission and the engine. When the engine is rapidly decelerated by moving throttle 41 toward E position, the lever 20 of variable speed control means 19 is automatically moved by spring 37 thereof from C position back towards A position, thereby lowering the operational ratio of the transmission. As lever 20 moves away from position C, when under engine braking or decelerating conditions, pressure in manifold 17 transfers to manifold 18 due to a reverse flow of power or torque in the transmission as the result of the power input changing to the output shaft from the input shaft. It will be understood that if control lever 20 is permitted to move beyond B toward A position while the vehicle is overriding the engine or the power input is on the output shaft a positive lock-up of the transmission will occur since the hydraulic motor M would try to drive the pump P in a reverse direction from that in which it is being driven by the input shaft from the prime mover, thereby causing a dangerous and serious strain on the transmission.

The present invention provides means for automatically positively controlling the speed of the variable speed unit whereby the lowering of the operational ratio of the transmission, from say 1 to 1 to 4 to 1, is regulated to relieve strain and facilitate engine braking. The means for automatically controlling the lowering of the operational ratio of the transmission utilizes the intake manifold vacuum effect or pressure in conjunction with a hydraulic pump operated by the output shaft of the transmission, when the prime mover is a gasoline engine as in the illustrated embodiment of the invention, or a suitable torque-sensing device in conjunction with the pump when the prime mover is a diesel engine or the like.

According to the invention, as shown, a control lever return stop 43 is provided in variable speed unit control means 19 which is automatically operated to regulate the return of lever 20 from C position to A position as the prime mover is decelerated and power input is transferred to the output shaft. Return stop 43, which is pivotally mounted to engage lever 20 and controllably restrain return movement thereof, is operably connected to a servomotor or hold-back cylinder 44 that is operated by fluid under pressure from a pump 45 carried and driven by output shaft 11. The pump 45, which draws fluid from the outlet 56a or sump 56 through line 56b, and whose output pressure is proportionate to the vehicle speed or the speed of rotation of the output shaft, is connected to the hold-back cylinder through a line 46 and is adapted to deliver fluid thereto proportionate to the speed of the vehicle. The hold-back cylinder is provided with a piston 47 biased toward the end of the cylinder, opening to line 46, by a spring 48 and includes a piston rod 49 extending outwardly of the opposite end of the cylinder and operably connected to return stop 43 through linkage 50. A hold-back valve 51 bisects the fluid line 46 between pump 45 and hold-back cylinder 44 for breaking communication therebetween. The valve is operated by a diaphragm device 52, which normally maintains the valve in line-closing position and includes a movable diaphragm member 52a operably connected to the valve stem 51a and biased by a spring 52b toward the valve. The diaphragm device 52 is connected through a line 53 to the intake manifold 54 of the prime mover and is adapted to be operated thereby to open valve 51 when the intake manifold vacuum becomes abnormally high. It will be understood that there is normally a vacuum effect or pressure in the intake manifold, which on deceleration of the prime mover becomes abnormally high and on acceleration becomes abnormally low.

In the operation of the transmission, with the engine braking or the automatic hold-back means as above described, if the driver decelerates the prime mover by moving throttle 41 toward position E or the vehicle overtakes the engine, the vacuum in intake manifold 54 becomes abnormally high and pulls diaphragm member 52a to the left against its spring 52b, thereby pulling hold-back valve stem 51a to the left to open communication between pump 45 and hold-back cylinder 44, through line 46. It should here be noted that when hold-back valve stem 51a is in line-closing position or to the right as seen in FIG. 1, that hold-back cylinder 44 is vented through line 46 and line 55 to the sump 56 in the variable speed unit and that pump 45 is similarly vented through check valve 57 and line 55. When hold-back valve stem 51a is shifted to the left by diaphragm device 52 into line-open position, pressure from the pump enters hold-back cylinder 44 to force piston 47 toward the opposite end of the cylinder, thereby shifting return stop 43, through piston rod 49 and linkage 50, into engagement with lever 20, thus causing the lever to remain at or in advance of the position it was in when the throttle 41 was closed. The spring 48 prevents piston 47 from moving to such a position that lever 20 is shifted back to position C. Since the pressure from the pump is proportionate to the vehicle speed, it will maintain the position of the lever 20 in a proportionate position against the pull of its return spring 37. As engine braking continues and the vehicle speed is reduced, the variable speed unit control lever 20 is allowed to move toward A position by the decreasing pressure from pump 45, exerting increasing braking power as a result of the constant lowering of the operational ratio between the output of the variable speed transmission and the prime mover.

It will be understood, that if it is desired, the piston 47 of hold-back cylinder 44 may be limited in its movement so that return stop 43 will not pass beyond B position of variable speed unit control means 19, thus providing a somewhat greater braking operational ratio than 1 to 1 if the vehicle is moving at high speed when the prime mover is decelerated. Where the piston 47 is limited in its upward movement, control lever 20 is enabled to immediately position itself at B position, having been positioned somewhere between B and C positions when the prime mover was decelerated, and a 2 to 1 operational ratio for braking immediately results.

A manual control valve 58 may, as shown, be provided in the engine braking systems for bleeding the pressure in hold-back cylinder 44 whereby in emergencies maximum engine braking may be achieved. The manual control valve 58, which is positioned within reach of the vehicle operator, is adapted to bleed hold-back cylinder 44 so that return stop 43 permits control lever 20 to immediately move to such a position that a low operational ratio is achieved for emergency engine braking.

At this point it should be noted that the transmission above described, includes in its closed system means for lubricating the transmission bearings (not shown) and replacing fluid lost from the system. According to the invention, auxiliary pumps 59 and 60 are connected to the hydraulic pump P and motor M, respectively, and are driven thereby. The auxiliary pumps, which are of the type wherein the fluid delivery pressure is directly proportional to their operational speed in either direction of rotation, are connected to the transmission sump outlet 56a, through line 56b, from which they draw fluid. The delivery side of the auxiliary pumps 59 and 60 are connected through lines 69 and 70 respectively to a filter 97 and a check valve 98. The fluid being delivered by the auxiliary pumps 59 and 60 flows through the filter 97 and check valve 98 into a line 99 and from there, in the direction of the arrow 100, to the transmission bearings (not shown). A check valve 101 permits lines 69 and 70 to vent to the sump 56 of the transmission through line 102 when pressure in the lines is excessive. Check valves 103 and 104 communicate line 99 with lines 29 and 18a, from the manifolds 17 and 18 respectively, and are adapted to open to permit fluid to enter the manifolds when the pressure therein is low as a result of fluid loss. Thus it will be seen, that the closed transmission system of the invention is self-lubricating and adapted to maintain and replenish its own fluid requirements.

*Automatic Coupling for Direct Drive*

The transmission hereinabove described, with its automatic controls for regulating the speed-torque relationship in the output shaft, may be provided with means for automatically coupling and uncoupling the input shaft from the prime mover to the power output shaft of the transmission in a direct 1 to 1 ratio. In accordance with the invention, the automatic direct drive which is shown in FIGS. 3 and 4, is only brought into play when the vehicle is moving under "road load torque" conditions, or with substantially constant torque demand, and is traveling at any speed in excess of some predetermined speed, such as 20 m.p.h. Further, the direct drive is automatically discontinued when torque increases or vehicle speed drops below the predetermined value. It is contemplated that the operator of the vehicle need merely adjust the accelerator of the prime mover to meet existing road requirements and the transmission will automatically adjust for acceleration, torque variation and sustained drive.

The basis for the automatic coupling of the input shaft to the output shaft for direct drive thereby resides in means for sensing the relative speeds of the hydraulic pump and hydraulic motor of the variable speed unit. The sensing means, according to the invention, are the auxiliary pumps 59 and 60 connected to and driven by pump P and motor M, respectively. The auxiliary pumps, which as afore-noted, are of the type wherein fluid delivery pressure is directly proportional to their speed in either direction of rotation, are operably connected through a balance valve assembly 61 to a servomotor or pressure responsive device 62 adapted to operate a clutch or coupling assembly 63. The balance valve assembly 61, which includes a housing 64 providing a balance chamber 65, is provided with a balance valve or piston 66 that is normally resiliently maintained in a central position in balance chamber 65 by springs 67 and 68. The balance chamber is communicated at opposed sides of piston 66 through lines 69 and 70 to auxiliary pumps 59 and 60, respectively. It will be understood that when the pressure of the fluid being delivered from the auxiliary pumps is equal, indicating that pump P and motor M are operating at approximately the same speed under "road load torque" conditions, the piston 66 will be maintained in balanced position in chamber 65 and that when the pressure of fluid being delivered from one of the pumps increases relative to the fluid pressure from the other pump, as would be the case when there is a torque increase or decrease in the transmission of a predetermined amount, the valve 66 will be displaced in the chamber in the direction of least pressure. The lines 69 and 70 are vented through check valves 101 and 105 respectively to sump 56 of the transmission to relieve the lines of excess pressure. Connected to and carried by the balance valve 66 in a slide or rod valve 71 which, when the balance valve is in normal position, connects, through passage 71a, line 69 from auxiliary pump 59 to a line 72 leading pressure responsive device 62. It should at this point be noted that balance valve assembly 61 is provided with means in the form of a double check valve 73 for venting excess fluid through line 74 to line 55 and thereafter to the sump 56 of the transmission.

The pressure responsive device 62, which operates clutch or coupling assembly 63 and is communicated to auxiliary pump 59 through line 72, balance valve assembly 61 and line 69, comprises a pressure cylinder 75 having a piston 76 slidably therein and normally biased by a spring 77 into idle position toward the end of the cylinder opening to line 72. Piston 76 is provided with a piston rod 76a having one end thereof extending outwardly of the cylinder which carries an arm 78 for operating the coupling assembly 63. The coupling assembly, while it may be of any type known to the art, in the illustrated form of the invention is a conventional friction type clutch, indicated at 79. At the opposite end of piston rod 76a is a passage 76b adapted to open communication between line 29 and line 80 from variable speed unit manifolds 17 and 18, respectively, when the pressure responsive device is operated, as hereinafter described, for balancing the pressure in the manifolds and enabling the variable speed unit to idle when the transmission is in direct drive.

Referring now to fluid pressure line 72 which communicates the auxiliary pump 59 to the pressure responsive device, it will be seen that a valve 81 operably connected to the pump 45 on output shaft 11, bisects line 72 normally breaking communication therethrough between the auxiliary pump and the pressure responsive device. The valve 81, which is provided with a piston 82 having a piston rod type valve member 83 normally biased by spring 84 to close line 72, is adapted to be operated by fluid emanating from pump 45 that, as will be recalled, delivers fluid in direct proportion to the speed of rotation of output shaft 11. The valve is of the type which will operate only at such time as the pressure thereon reaches a predetermined value, such as, in the illustrated embodiment of the invention, 20 m.p.h.

Also interrupting line 72 between the sensing means and the pressure responsive device 62 is a two-stage valve 85 which is adapted to normally vent the pressure responsive device 62 and to disconnect the output shaft from direct drive when the prime mover is accelerated or the vehicle overrides the engine. The two-stage valve includes a housing 86 providing a first stage valve chamber 87 and a second stage valve chamber 88. Positioned in the first valve chamber 87 and adapted to be moved back and forth therein is a piston type valve 89 that is biased by a spring 90 to normally interrupt line 72. In the normal position of valve member 89 pressure responsive device 62 is vented through line 72, venting passage 89a of the first stage of valve 85 and line 74 to the sump of the transmission. It will be understood that fluid under pressure from the auxiliary pump 59 passing through balance valve 61 and valve 81 will move piston 89 to the left against spring 90 thereby opening line 72 (see FIG. 4) to pressure responsive device 62. The second stage 88 of two-stage valve 85 includes a piston type valve 91 adapted to be moved back and forth in chamber 88 and having its outer end operably connected to a diaphragm 92a of a diaphragm device 92. A spring 92b normally biases the diaphragm 92a and the valve rod 91 in valve open position, when the intake manifold 54 of the prime mover 13 is under normal intake manifold vacuum, whereby fluid may pass through line 72 into the second stage of the valve. The diaphragm device 92 is operably connected through the line 53 to the intake manifold 54 of prime mover 13 and is adapted to be shifted to valve-off the line 72 when the vacuum increases or decreases in the intake manifold. It will be understood, of course, that in diesel applications of the invention, a suitable torque-sensing device may be substituted for the intake manifold vacuum operated diaphragm device 92.

In the operation of the transmission, shown in FIGS. 3 and 4, when the engine is not running, there is no hydraulic pressure in the system and pressure responsive device 62 is vented through venting passage 89a of the first stage of two-stage valve 85 to the sump. In this condition of the transmission the pressure responsive device or servomotor 62 is in variable speed drive position and the friction clutch 79 is disengaged. When the engine or prime mover is started, and is idling, the second stage 88 of two-stage valve 85 is open as a result of normal engine intake manifold vacuum and the auxiliary pumps 59 and 60 are operating at relatively the same low speeds delivering little or no pressure. In this condition balance valve 61 is held in balance, opening line 72 to valve 81 and the latter valve is maintained closed since there is no pressure being imparted to it from pump 45; the output shaft is not being driven and, therefore, the pump is not operating.

When it is desired to start the vehicle moving or to impart motion to output shaft 11, and with the slide clutch 27 in forward drive position, the accelerator of the prime mover and the control lever for the variable speed unit 16 are operated, as previously described, to accelerate the prime mover and provide the required starting torque. While the output shaft is turning at less than the predetermined value of 20 m.p.h., valve 81 is maintained in line closing position and no fluid is permitted to pass through line 72 to actuate clutch operating device 62. As the vehicle exceeds 20 m.p.h., valve 81 opens under the pressure of fluid from pump 45 but balance valve 61 is closed due to a relative pressure differential between auxiliary pump 59 and auxiliary pump 60. The pressure differential is the result of the torque on output shaft 11 being multiplied through the automatic action of the transmission, wherein the speed of the right hand bevel gear 24 is reduced in the process of multiplying torque so that the speed of the pump P in the variable speed unit is greater than the speed of the motor M. The conditions above-described relating to the control for automatic direct drive when the vehicle is being started from stopped position, will, of course, also exist when the vehicle is being accelerated at a speed in excess of 20 m.p.h., such as when it is climbing a hill.

After the vehicle has started moving and torque has decreased to just that which is necessary to overcome rolling and wind resistances, and the hydraulic pump P and motor M are operating at approximately equal speeds, resulting in the auxiliary pumps 59 and 60 delivering fluid under equal pressure, the spring balanced valve 61 will be in balanced position as a result of equal pressure in the lines 69 and 70 from the auxiliary pumps. With the balance valve in this position, fluid under pressure is enabled to pass into line 72 in the direction of clutch operating pressure responsive device 62. The speed of the vehicle being in excess of 20 m.p.h., pump 45 is delivering fluid under sufficient pressure to open valve 81 enabling the fluid to continue along line 72 to force piston 89 in the first stage 87 of two-stage valve 85 to the left into open position so that line 72 is open throughout its length to the pressure responsive device 62. It should be noted that the second stage 88 of the valve is in normal open position due to the normal vacuum in the intake manifold of the prime mover. As fluid flows through line 72 into engagement with piston 76 of the pressure responsive device 62, the piston is shifted to the left against spring 77 carrying rod 76a and arm 78 with it. The arm 78 acts on friction clutch 79 in the conventional manner to close the same thereby locking bevel gear 24 to input shaft 15 from the prime mover and coupling the output shaft to the input shaft in a 1 to 1 ratio. When the right hand and left hand bevel gears of differential mechanism 14 are locked together in direct drive, both the hydraulic pump P and motor M operate under practically no mechanical or hydraulic load and are balanced through the open communication at 76b of the lines 29 and 30, from manifolds 17 and 18, respectively.

The controls for the automatic drive are so arranged that the second stage 88 of two-stage valve 85 will be kept open to the first stage 87 thereof during reasonable variations of intake manifold vacuum as the result of movement of the engine throttle or accelerator. However, if the prime mover is suddenly rapidly accelerated to meet a sudden torque requirement, the decrease in vacuum in the intake manifold will enable spring 92b to force diaphragm 92a to the right carrying valve member 91 to closed position, thereby interrupting the flow of fluid through line 72 to the pressure responsive device. It will be seen that movement of valve member 91 to the right to interrupt line 72 will open line 72 from the pressure responsive device 62 to line 74, through port 91a thereby enabling the pressure responsive device to vent to sump 56. With the pressure responsive device vented, the spring 77 causes piston 76 to move to the right thereby disengaging the clutch 79 and causing the transmission to operate in variable speed drive position. With the variable speed unit 16 again in full operation, the hydraulic motor M will operate at a lower speed than the pump P because of torque multiplication requirements and the balance valve 61 will shift upwards as the result of higher pressure from auxiliary pump 59 relative to auxiliary pump 60. Shifting of the balance valve will vent line 72 back through line 74 to the sump and will permit the first stage 87 of two-stage valve 85 to move back to the right as seen in FIG. 3 so that the pressure responsive device is directly vented, as above described.

As the demand for torque in the transmission diminishes and the accelerator is eased, intake manifold vacuum of the prime mover approaches normal and the second stage 88 of two-stage valve 85 is returned to open position by diaphragm device 92. Thereafter, as the balance valve is again brought to balanced position by the equalization of pressure in the auxiliary pumps 59 and 60, the first stage 87 of the two-stage valve is opened and the pressure responsive device 62 is operated to couple the output shaft 11 to the input shaft from the prime mover in a direct 1 to 1 operational ratio.

Assuming now that the vehicle overrides the engine when the transmission is in direct drive or the accelerator is suddenly eased, there is an abnormal high intake manifold vacuum which operates to draw diaphragm 92a of the diaphragm device 92 to the left against spring 92b to close the second stage 88 of the two-stage valve thereby venting pressure responsive device 62 through port 91b and line 74 to the sump. It will be understood that the controls will thereafter operate, as was described, with respect to the release from direct drive resulting from acceleration of the prime mover.

The present invention also provides manual control means 93, within the reach of the vehicle operator, for releasing the transmission from direct drive under emergency conditions. The manual control 93 which is positioned in line 72, includes a cylinder 94 and a valve stem 95 normally biased by a spring 96 into line open position. In the operation of the manual control, with the direct drive in operation, depression of the valve stem 95 against spring 96 interrupts line 72 and immediately vents pressure responsive device 62 to the sump through line 74.

*Maximum Torque Control*

Referring now to FIG. 5 of the drawings, a modification of the transmission controls is shown which enables a vehicle operator or the like to utilize some to the excess torque potential of the transmission for temporarily obtaining extra power. The modified controls are adapted to be manually operated, when required, and are provided with means for automatically discontinuing their operation when vehicle speed increases past a predetermined value so that the transmission is relieved of excess strain.

The controls of the transmission, as afore-mentioned, are provided with means, in the form of safety check valves 17a and 18b, for venting the manifolds 17 and 18 of the variable speed unit 16 to the sump 56, whereby the torque output of the transmission is controlled to prevent excess strain thereon. It will be recalled that the check valves 17a and 18b are adapted to open and permit fluid to flow to the sump when control lever 20 is moved out of position A toward position B and torque and the resultant manifold pressure are extremely high, and that the valves close when torque and pressure have decreased to some predetermined value at which desired power is obtained without excess strain on the transmission. In the example heretofore mentioned, it was assumed that, when the predetermined torque potential and manifold pressure was reached, when lever 20 was moved between A and B positions and valve 17a and 18b closed, a 4 to 1 operational ratio existed between the prime mover and the output of the variable speed unit 16 and lever 20 was in a position adjacent A.

While a predetermined operational ratio such as 4 to 1 will provide the necessary torque under most normal conditions, it will be readily understood that occasions will arise when extra torque is necessary or desirable.

The present modification to the transmission controls is adapted to facilitate achieving additional torque when it is required without placing an unduly heavy strain on the transmission.

According to the invention, the safety check valve 17a, in the line 29 from variable speed unit manifold 17, is modified as shown at 17a', in FIG. 5, so that the pressure required to open the valve is enabled to be increased. The check valve 17a', which includes a valve housing 106 opening to line 29 at 107 and a ball 108 adapted to close the opening 107 under the pressure of spring 109, is provided with a piston 110 adapted to be moved back and forth within the housing 106 against spring 109. The piston 110 is provided with an outwardly extending piston rod 111 having means 112 thereon for adjustably limiting the length of the piston stroke. The interior of housing 106 is communicated through line 102 to the sump 56 of the transmission whereby fluid entering the valve from line 29 and manifold 17 is vented to the sump. The interior of housing 106 is also communicated, at the side of piston 110 directed away from ball valve 108, through line 69' via valve 113, line 69" and line 69 to auxiliary pump 59 that, as afore-described, is operated by hydraulic pump P. Interrupting the flow between the line 69" and the line 69 is a normally open valve 81' and a manually operated valve 113. The manually operated valve 113, which is adapted to be positioned within the vehicle for easy access by the operator thereof, includes a valve cylinder 114 having a rod type valve stem member 115 positioned for back and forth movement therein. The valve stem 115, which may be provided with a gripping knob or handle 116, is normally positioned within the cylinder 113 to interrupt or valve-off check valve 17a' from auxiliary pump 59. In the normal position of the valve 113 the valve stem 115 extends outwardly of cylinder 114 and is retained in its normal position by a spring pressed ball detent 117 or the like. When valve stem 115 is shifted inwardly of cylinder 114, line 69, line 69' and line 69" are opened throughout their length through passage means 115a. In its normal position the passage means 115a.

connects the line 69' to an extension 102' of the line 102 which leads to the oil sump.

The valve 81' which, in the illustrated form of the invention, is shown integral with valve 113 is communicated through a line 46' to the pump 45, which as aforenoted, is carried and operated by output shaft 11 of the transmission. The valve 81' includes a piston 82' adapted to be shifted back and forth within the valve having a piston rod 83' connected thereto. The piston is biased by a spring 84' toward the end of the valve opening to line 46', the spring being of such strength that the piston may only be shifted within the valve when the pressure of the fluid from pump 45 has reached a predetermined value, such as that caused by the output shaft 11 operating the pump at a speed of 20 m.p.h. While the valve 81' may form a separate unit by itself and be individually connected to pump 45 for operation thereof, it will be understood that valve 81 of the transmission control system shown in FIG. 3 may be modified to serve the purpose of valve 81' hereinafter to be described.

In the operation of the maximum torque control, when it is desired to apply more torque to the output shaft 11 of the transmission than would be achieved from the normal low operational ratio of say 4 to 1, the operator of the vehicle presses valve stem 115 inwardly, thereby opening line 69 from auxiliary pump 59 to the check valve 17a'. The pressure of the fluid flowing through the line 69 from the auxiliary pump shifts piston 110 of the check valve against spring 109 thereby increasing the pressure necessary to displace ball valve 108 and closing off manifold 17 from the sump. In this manner a higher operational ratio is obtained between the prime mover and the output of the variable speed unit 16 and the torque delivered to output shaft 11 is proportionately increased. It will be seen that by adjusting limit means 112 to regulate the stroke of piston 110, the increase in torque achieved by use of the maximum torque control is regulated.

In order that the increased torque output of the transmission does not place too great a strain on the transmission structure, the control is adapted to automatically discontinue operation when a predetermined speed of the output shaft has been achieved. When the speed of the vehicle or the output shaft obtains a predetermined speed, such as 20 m.p.h., the fluid flowing from pump 45 is under sufficient pressure to operate valve 81' so that the piston rod 83' thereof is shifted to the right, as seen in FIG. 5, into engagement with manual valve stem 115 to shift the latter to the right to interrupt communication between auxiliary pump 59 and check valve 17a' through line 69.

Thus it will be seen that a control has been provided which enables a vehicle operator to avail himself of the excess torque potential of the transmission, when extra torque is required, without unduly burdening the transmission or dangerously straining the parts thereof.

Thus, among others, the several objects and advantages of the invention as aforenoted are achieved. Obviously numerous changes in the structure may be resorted to without departing from the spirit of the invention as defined by the claims.

We claim:

1. A variable speed transmission having an acceleratable and deceleratable prime mover, said transmission including a differential mechanism operably connected to an output shaft and having one side thereof driven by said prime mover and the other side by a hydraulic speed drive unit infinitely variable between limits, said variable speed unit including a hydraulic pump operated by said prime mover and a hydraulic motor operated by said pump and having control means for infinitely varying the output speed of the unit between said limits: the improvement comprising accelerator means for varying the speed of the prime mover; and resiliently yielding means responsive to movement of the accelerator means tending to coordinately and directly advance said control means from its non-driving limit toward its maximum driving limit depending on the extent of movement of the accelerator means.

2. A variable speed transmission having an acceleratable and deceleratable prime mover, said transmission including a differential mechanism operably connected to an output shaft and having one side thereof driven by said prime mover and the other side by a hydraulic speed drive unit infinitely variable between limits, said variable speed unit including a hydraulic pump operated by said prime mover and a hydraulic motor operated by said pump and having control means for varying the output speed of the unit between said limits: the improvement comprising accelerator means for varying the speed of the prime mover; resiliently yielding means response to movement of the accelerator means tending to automatically advance said control means from its non-driving limit toward its maximum driving limit depending on the extent of movement of the accelerator means; and means responsive to the load on the variable speed unit for overcoming the tendency of said resiliently yielding means to advance the control means and limit the extent of movement thereof.

3. A variable speed transmission as defined in claim 2, in which there are means including means responsive to a determinate speed of the output shaft and means responsive to the suction effect of the intake manifold of the prime mover, for moving the variable speed control means from whatever position it happens to be in toward maximum driving position when the output shaft tends to drive the variable speed unit and the prime mover.

4. A variable speed transmission as defined in claim 2, in which there are means including means responsive to a reversal of the direction of the transmission of torque between the output shaft and the prime mover for moving the control means for the variable speed unit from whatever position it happens to be in toward maximum driving position.

5. A variable transmission as defined in claim 4, in which there are manually operable means for limiting the extent of said automatic movement of the variable speed control means toward maximum driving position.

6. A variable speed unit as defined in claim 2, in which the means responsive to the load on the variable speed unit comprises a hydraulic servomotor operated by the pressure of fluid flowing from said pump to said motor of the variable speed unit, said servomotor acting against said yielding resilient means in proportion to the value of said pressure.

7. A variable speed transmission as in claim 3 wherein said speed responsive means comprises a pump having a fluid output proportionate to the speed of said output shaft, and in which said means operated by said speed responsive means comprises a servomotor operated by said pump and mechanical means operated by said servomotor for regulating said control means for varying the output speed of said variable speed unit.

8. A variable speed transmission as in claim 7 wherein the means responsive to the suction effect of the intake manifold, is a diaphragm operated valve between said pump and said servomotor, said valve being opened to enable said pump to operate said servomotor when the vacuum in said intake manifold is abnormally high.

9. A variable speed transmission having an accelerataible and deceleratable prime mover, said transmission including a differential mechanism operably connected to an output shaft and having one side thereof driven by said prime mover and the other side by a hydraulic speed drive unit infinitely variable between limits, said variable speed unit including a hydraulic pump operated by said prime mover and a hydraulic motor operated by said pump and having means for varying the output speed of the unit between said limits: the improvement comprising coupling means for automatically causing the output shaft to be driven directly by said prime mover, and means for sensing the relative speed of said hydraulic pump and hydraulic motor and in response to a predetermined speed relation therebetween controlling the actuation of said automatic coupling means to positively connect the prime mover to the output shaft.

10. A variable speed transmission as in claim 9 and means for delaying the actuation of said coupling means by said sensing means at least until the output shaft has attained a predetermined speed.

11. A variable speed transmission as in claim 9 wherein the sensing means comprises auxiliary pumps operably connected to said hydraulic pump and hydraulic motor respectively, the pressure developed by said auxiliary pumps being directly proportional to their speeds of rotation in either direction, and in which there are pressure responsive means adapted to be operated by said auxiliary pumps when their pressure is substantially equal and operably connected to said coupling means for operating the same, and means operably connected to said output shaft for delaying the operation of said responsive means until a predetermined speed-torque relation is achieved in the transmission.

12. A variable speed transmission as in claim 9 and means operably connected to said prime mover for causing said output shaft of the transmission to be disconnected from direct drive by said prime mover, said disconnecting means being actuated when a sudden torque change occurs in the transmission.

13. A variable speed transmission as in claim 9 and manually operable means for causing said output shaft to be disconnected from direct drive by said prime mover.

14. A variable speed transmission having an acceleratable and deceleratable prime mover, said transmission including a differential mechanism operably connected to an output shaft and having one side thereof driven by said prime mover and the other side by an infinitely variable hydraulic speed drive unit having a first range of speed change from a determinate value in one direction to nil and a second range of speed change from nil to a determinate value in the opposite direction, said variable speed unit including a hydraulic pump operated by said prime mover and a hydraulic motor operated by said pump and having means for varying the output speed of the unit between said first and second speed ranges: the improvement comprising coupling means for automatically causing the output shaft to be driven directly by said prime mover, and means for sensing the relative speed of said hydraulic pump and hydraulic motor and in response to a predetermined speed relation therebetween controlling the actuation of said automatic coupling means to positively connect the prime mover to the output shaft.

15. A variable speed transmission as in claim 14 and means for delaying the actuation of said coupling means by said sensing means at least until the output shaft has attained a predetermined speed.

16. A variable speed transmission as in claim 14 in which there is a pump operated by said output shaft having a fluid delivery pressure in proportion to the speed of the output shaft and a valve adapted to be opened by said pump at a predetermined speed of said output shaft, said valve in the open position thereof being adapted to operably connect said sensing means to said automatic coupling means for actuating the latter.

17. A variable speed transmission as in claim 14 wherein the sensing means comprises auxiliary pumps operably connected to said hydraulic pump and hydraulic motor respectively, the pressure developed by said auxiliary pumps being directly proportional to their speeds of rotation in either direction, and in which there are pressure responsive means adapted to be operated by said auxiliary pumps when their pressure is substantially equal and operably connected to said coupling means for operating the same, and means operably connected to said output shaft for delaying the operation of said responsive means until a predetermined speed-torque relation is achieved in the transmission.

18. A variable speed transmission as in claim 17 wherein said delaying means comprises a pump operated by said output shaft having a fluid delivery output proportional to the speed of said output shaft and a valve adapted to be opened by said pump at a predetermined speed of said output shaft, said valve in the open position thereof being adapted to operably connect one of said auxiliary pumps to said pressure responsive means for actuating the same.

19. A variable speed transmission as in claim 14 and means operably connected to said prime mover for causing said output shaft to be disconnected from direct drive by said prime mover, said disconnecting means being actuated when a sudden substantial torque change occurs in the transmission.

20. A variable speed transmission as in claim 19 wherein said prime mover is a gasoline engine having an intake manifold and said disconnecting means comprises a normally open diaphragm operated valve positioned to operably connect said sensing means and said automatic coupling means, said valve being adapted to be moved to closed position to operably separate said sensing means from said coupling when there is an abnormal change in intake manifold vacuum.

21. A variable speed transmission as in claim 14, and manually operable means for causing said output shaft to be disconnected from direct drive by said prime mover.

22. A variable speed transmission as in claim 17, and means operably connected to said prime mover for interrupting the operation of said pressure responsive means, whereby said output shaft is disconnected from direct drive by said prime mover.

23. A variable speed transmission as in claim 22, wherein said prime mover is a gasoline engine having an intake manifold and said means for interrupting the operation of the pressure responsive means comprises a normally open diaphragm operated valve positioned between said auxiliary pumps and said pressure responsive device for connecting the same, said valve being adapted to be moved to closed position to operably separate said auxiliary pumps from said pressure responsive device when there is an abnormal change in intake manifold vacuum.

24. A variable speed transmission as in claim 17, and manually operable means for interrupting the operation of said pressure responsive means, whereby said output shaft is disconnected from direct drive by said prime mover.

25. A variable speed transmission having an acceleratable and deceleratable prime mover, said transmission including a differential mechanism operably connected to an output shaft and having one side thereof driven by said prime mover and the other side by a hydraulic speed drive unit infinitely variable between limits, said variable speed unit including a hydraulic pump operated by said prime mover and a hydraulic motor operated by said pump and having means for varying the output speed of the unit between said limits: the improvement comprising automatic means establishing a predetermined maximum torque which the variable speed unit may develop and transfer to the output shaft within an optimum factor of safety; and manually operable means for altering said automatic means whereby torque in excess of said predetermined maximum torque may be developed and transferred by the variable speed unit.

26. A variable speed transmission as in claim 25 in which there are means operated in response to a predetermined speed of said output shaft for interrupting the operation of said manually operated means.

(References on following page)

References Cited in the file of this patent

UNITED STATES PATENTS

| | | |
|---|---|---|
| 1,356,718 | Holt | Oct. 26, 1920 |
| 2,336,912 | Zimmerman | Dec. 14, 1945 |
| 2,583,656 | Lay | Jan. 29, 1952 |
| 2,599,814 | Cull | June 10, 1952 |
| 2,774,255 | Morris | Dec. 18, 1956 |
| 2,874,591 | Thoma | Feb. 24, 1959 |
| 2,931,250 | Ebert | Apr. 5, 1960 |
| 2,994,233 | Gerard | Aug. 1, 1961 |